United States Patent
Lau et al.

(10) Patent No.: US 11,086,731 B2
(45) Date of Patent: Aug. 10, 2021

(54) GATEWAY BACKUP SYSTEM AND METHOD

(71) Applicant: California Eastern Laboratories, Inc., Santa Clara, CA (US)

(72) Inventors: Kenneth D. Lau, Longmont, CO (US); Damon Mark Stewart, Longmont, CO (US)

(73) Assignee: California Eastern Laboratories, Inc., Santa Clara, CA (US)

( * ) Notice: Subject to any disclaimer, the term of this patent is extended or adjusted under 35 U.S.C. 154(b) by 358 days.

(21) Appl. No.: 16/245,513

(22) Filed: Jan. 11, 2019

(65) Prior Publication Data

US 2020/0226031 A1 Jul. 16, 2020

(51) Int. Cl.
| | |
|---|---|
| *G06F 11/14* | (2006.01) |
| *G06F 16/901* | (2019.01) |
| *G06F 16/13* | (2019.01) |
| *G06F 16/14* | (2019.01) |
| *G06F 11/08* | (2006.01) |

(52) U.S. Cl.
CPC .......... *G06F 11/1464* (2013.01); *G06F 11/08* (2013.01); *G06F 11/1451* (2013.01); *G06F 11/1461* (2013.01); *G06F 16/137* (2019.01); *G06F 16/152* (2019.01); *G06F 16/901* (2019.01)

(58) Field of Classification Search
CPC ....... G06F 16/137; G06F 16/152; G06F 11/08
See application file for complete search history.

(56) References Cited

U.S. PATENT DOCUMENTS

| | | | | |
|---|---|---|---|---|
| 5,559,991 | A * | 9/1996 | Kanfi | G06F 11/08 707/999.202 |
| 6,374,266 | B1 * | 4/2002 | Shnelvar | G06F 11/1453 |
| 7,055,008 | B2 | 5/2006 | Niles et al. | |
| 8,041,677 | B2 | 10/2011 | Sumner et al. | |
| 10,263,841 | B1 * | 4/2019 | Stamatakis | H04L 41/145 |
| 2014/0337614 | A1 * | 11/2014 | Kelson | H04L 63/20 713/152 |
| 2016/0065407 | A1 * | 3/2016 | Saltsidis | H04L 41/0806 370/255 |
| 2017/0308543 | A1 * | 10/2017 | Salyers | G06F 3/0635 |
| 2019/0334769 | A1 * | 10/2019 | Stamatakis | H04L 41/0813 |
| 2020/0167148 | A1 * | 5/2020 | Park | G05B 19/042 |

* cited by examiner

*Primary Examiner* — Charles E Lu
(74) *Attorney, Agent, or Firm* — Richard W. James (57) ABSTRACT

In embodiments, a system and method backs up and restores data stored on a gateway using a signature having sub-signatures that represent specific categories of data elements of the data, the categories regarding the operation of one or more actuating devices and possibly other items, the system and method changing the operation of the one or more actuating devices and possibly the other items based on restored or updated data elements of the data stored on the gateway.

25 Claims, 6 Drawing Sheets

GATEWAY BACKUP SYSTEM AND METHOD

BACKGROUND

Field of the Disclosure

The present disclosure relates to a backup system and method, and more particularly to a backup system and method that includes categorized elements of data and corresponding signatures to improve backup and restore efficiency of a gateway and networked devices, such as actuating devices.

Brief Description of Related Art

Gateways may store data used to communicate with other electronic devices over a network. That data may be updated or become corrupted. Therefore, the data may be periodically backed up so that it can be restored when desired. Such a backup system may use significant resources, including bandwidth, to keep the data stored on the gateway error-free and up-to-date.

There may therefore be a need for a backup system and method that efficiently backs up and restores data on a gateway. There may also be a need for a backup system and method that efficiently backs up and restores such data to thereby facilitate the accurate communication of the gateway with electronic devices. There may also be a need for a backup system and method that efficiently backs up and restores data on a gateway to thereby facilitate the change of operation, by way of the gateway, of those electronic devices.

SUMMARY OF THE INVENTION

In one embodiment, a backup method includes: storing, on a gateway on a local area network, data that comprises data elements that are each in a different one of a plurality of categories that together regard operation of a plurality of actuating devices on the local area network; storing the data on a database; creating a signature comprising sub-signatures that each represent a different one of the data elements along with the category that data element is in; updating the data stored on the gateway by updating the data elements, such that the updated data elements of the updated data comprise the data elements except that one or more of the data elements in one or more of the plurality of categories are changed; creating an updated signature that comprises updated sub-signatures that each represent a different one of the updated data elements of the updated data stored on the gateway, and thus each represent said different one of the plurality of categories; determining that the updated signature does not match the signature; determining, for each of the categories, whether the updated sub-signature and sub-signature representing that category are different; and copying, from the gateway to the database, for each category in which the updated sub-signature and sub-signature representing that category are different, the updated data element in that category and thereby replacing, with that updated data element, the data element in that category stored on the database.

In another embodiment, a backup system includes a gateway on a local area network, the gateway comprising a processor and a computer readable storage medium, the computer readable storage medium including code executable by the processor to: store, on a gateway on a local area network, data that comprises data elements that are each in a different one of a plurality of categories that together regard operation of a plurality of actuating devices on the local area network; store the data on a database; create a signature comprising sub-signatures that each represent a different one of the data elements along with the category that data element is in; update the data stored on the gateway by updating the data elements, such that the updated data elements of the updated data comprise the data elements except that one or more of the data elements in one or more of the plurality of categories are changed; create an updated signature that comprises updated sub-signatures that each represent a different one of the updated data elements of the updated data stored on the gateway, and thus each represent said different one of the plurality of categories; determine that the updated signature does not match the signature; determine, for each of the categories, whether the updated sub-signature and sub-signature representing that category are different; and copy, from the gateway to the database, for each category in which the updated sub-signature and sub-signature representing that category are different, the updated data element in that category and thereby replace, with that updated data element, the data element in that category stored on the database.

In yet another embodiment, a data backup system includes: a remote database that is remote from a local area network, the remote database storing: first data that comprises first data elements that are each in a different one of a plurality of categories regarding the operation of a plurality of actuating devices on the local area network; and a first signature comprising first sub-signatures that each represent a different one of the data elements along with the corresponding different one of the plurality of categories that data elements is in. The data backup system in that embodiment may also include a gateway on the local area network, the gateway storing: second data that comprises second data elements that each are in a different one of the plurality of categories regarding the operation of the plurality of actuating devices on the local area network; and a second signature that comprises second sub-signatures that each represent a different one of the second data elements of the second data, and thus each represent said different one of the plurality of categories that second data element is in, wherein the gateway includes a processor and a computer readable storage medium including code executable by the processor to: determine whether the second signature matches the first signature, and if the second signature does not match the first signature, determine, for each of the plurality of categories, whether the corresponding second sub-signature and first sub-signature representing that category are different; and copy, from the gateway to the remote database, for each category in which the second sub-signature and first sub-signature representing that category are different, the second data element in that category and thereby replacing, with that second data element, the first data element in that category stored on the remote database.

In another embodiment a data backup system includes; a remote database that is remote from a local area network, the remote database storing a plurality of sets each of both first data and a corresponding first signature, wherein the first data is different in at least a plurality of the sets and the first signature is different in at least a plurality of the sets, wherein for each of the sets: the first data comprises first data elements that each represent a different one of a plurality of categories regarding operation of a plurality of actuating devices on the local area network; and the first signature comprises first sub-signatures that each represent both a different one of the first data elements of the first data and the category that different one of the first data elements is in. The data backup system in that embodiment may also include a gateway on the local area network, the gateway storing: second data that comprises second data elements that each are in said different one of the plurality of categories regarding the operation of the plurality of actuating devices on the local area network; and a second signature that comprises second sub-signatures that each represent a different one of the second data elements of the second data, and thus each represent said different one of the plurality of categories that second data element is in, wherein the gateway includes a processor and a computer readable storage medium including code executable by the processor to: determine, for a selected one of the sets of both first data and corresponding first signature, whether the first signature matches the second signature, and if the first signature does not match the second signature, determine, for each of the plurality of categories, whether the first sub-signature and second sub-signature representing that category are different; and copy from the remote database to the gateway, for the selected one of the sets of first data and corresponding first signature, for each first sub-signature that is different than the corresponding second sub-signature for each of the represented plurality of categories, the first data element in that category and thereby replace, with that first data element, the second data element in that category stored on the gateway.

Other embodiments, which may include one or more parts of the aforementioned systems and methods or other parts, are also contemplated, and may thus have a broader or otherwise different scope than the aforementioned systems and methods. Thus, the embodiments in this Summary of the Invention are mere examples, and are not intended to limit or define the scope of the invention or claims.

BRIEF DESCRIPTION OF THE DRAWINGS

For the present disclosure to be easily understood and readily practiced, the present disclosure will now be described for purposes of illustration and not limitation, in connection with the following figures.

The accompanying drawings, wherein like reference numerals are employed to designate like components, are included to provide a further understanding of the present inventions, are incorporated in and constitute a part of this specification, and show embodiments of those systems and methods that together with the description serve to explain those systems and methods.

Various other objects, features and advantages of the invention will be readily apparent according to the following description exemplified by the drawings, which are shown by way of example only, wherein.

DETAILED DESCRIPTION OF THE INVENTION

Reference will now be made to embodiments of gateway backup systems and methods, examples of which are illustrated in the accompanying drawings. Details, features, and advantages gateway backup systems and methods therefore will become further apparent in the following detailed description of embodiments thereof. The gateway backup systems and methods provide for the efficient backup and restoration data stored on the gateway. The gateway may use that data to, for example, control networked devices in specified zones, such as the lighting in a specific area of a building.

It is to be understood that the specific systems and methods described in the following specification are simply exemplary embodiments of the present invention and are not to be considered as limiting.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

Figure 1:
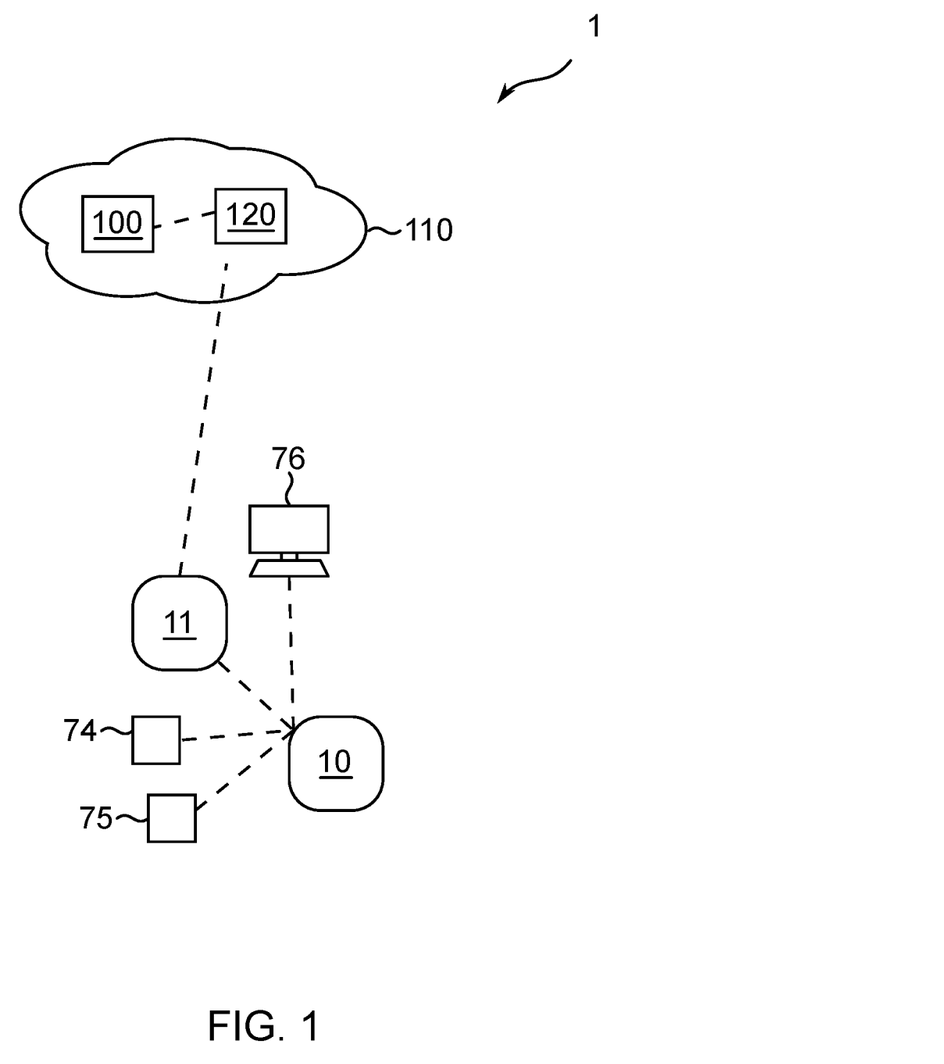
FIG. 1 illustrates an embodiment of a backup system for a gateway.

FIG. 1 illustrates an embodiment of a backup system 1 for a gateway. The backup system 1 may backup and restore data on the gateway 10. The backup system 1 may include the gateway 10 and a database 100.

The gateway 10 may be in communication with the database 100 as desired. For example, in an embodiment, the database 100 is a remote database on a remote network 110, which may be a network remote from a local area network on which the gateway 10 resides and accessible via the Internet. The network 110, if remote, may be considered one or more networks remote from the local area network, and may be part of a cloud. Such a database 100 may be on or in communication with, such as through the Internet, a remote server 120, which may be a server on the remote network 110. The gateway 10 may be in communication with the database 100, if remote, via another gateway 11, which may communicate with the database 100 via the remote server 120. In another embodiment, the gateway 10 communicates with the database 100 via the remote server 110 directly, without the gateway 11. In another embodiment, the gateway 11 may instead be a router. In an embodiment, the database 100 may be considered one or more databases that together stored the various data and signatures described herein.

The gateway 10 in the system 1 may control one or more networked devices, such as one or more actuating devices 74 over a local area network such as within a building, such as described herein. In an embodiment, the system 1 may also include or operate with one or more sensing devices 75 that sense conditions that trigger certain actions with respect to one or more of the actuating devices 74, such as by way of the gateway 10 sending signals directly or indirectly to those actuating devices 74 to so act when those sensed conditions are met. In embodiments, the one or more actuating devices 74 and one or more sensing devices 75 may be on the local area network, and thus in communication over the local area network directly or indirectly with the gateway 10.

The actuating devices 74 may be, for example, lighting fixtures or other lighting, blinds, HVAC systems and devices, and/or various other powered devices, and/or manually or otherwise operated switches or other controllers for the aforementioned or other powered devices. In an embodiment, one or more of the actuating devices 74 include both the powered devices (e.g., lighting fixtures) and their switches or other controllers. As described herein, operation (or change in operation) of an actuating device 74 that is a switch for a light or lights may operate (or change the operation of) the light or lights in a specified way.

The sensing devices 75 may be, for example, light level sensors, temperature sensors, motion sensors, and/or other ambient or other condition sensors or detectors. In an embodiment, one or more of the sensing devices 75 may be included in one or more powered devices, such as one or more powered devices described in the paragraph above.

In one embodiment as shown in FIG. 1, the local area network may include thereon the gateway 10 along with the gateway 11, and one or more actuating devices 74 and one or more sensing devices 75. The gateway 10 may also be in communication with a general purpose computer 76, which may also be a part of the system 1 and local area network. In an embodiment, a user may use the general purpose computer 76 to prompt the gateway 10 to, such as described herein, back up or restore data. In an embodiment, the local area network includes the local area network 70 of FIG. 3 described below or components thereof, and may be or include a mesh network.

Figure 2:
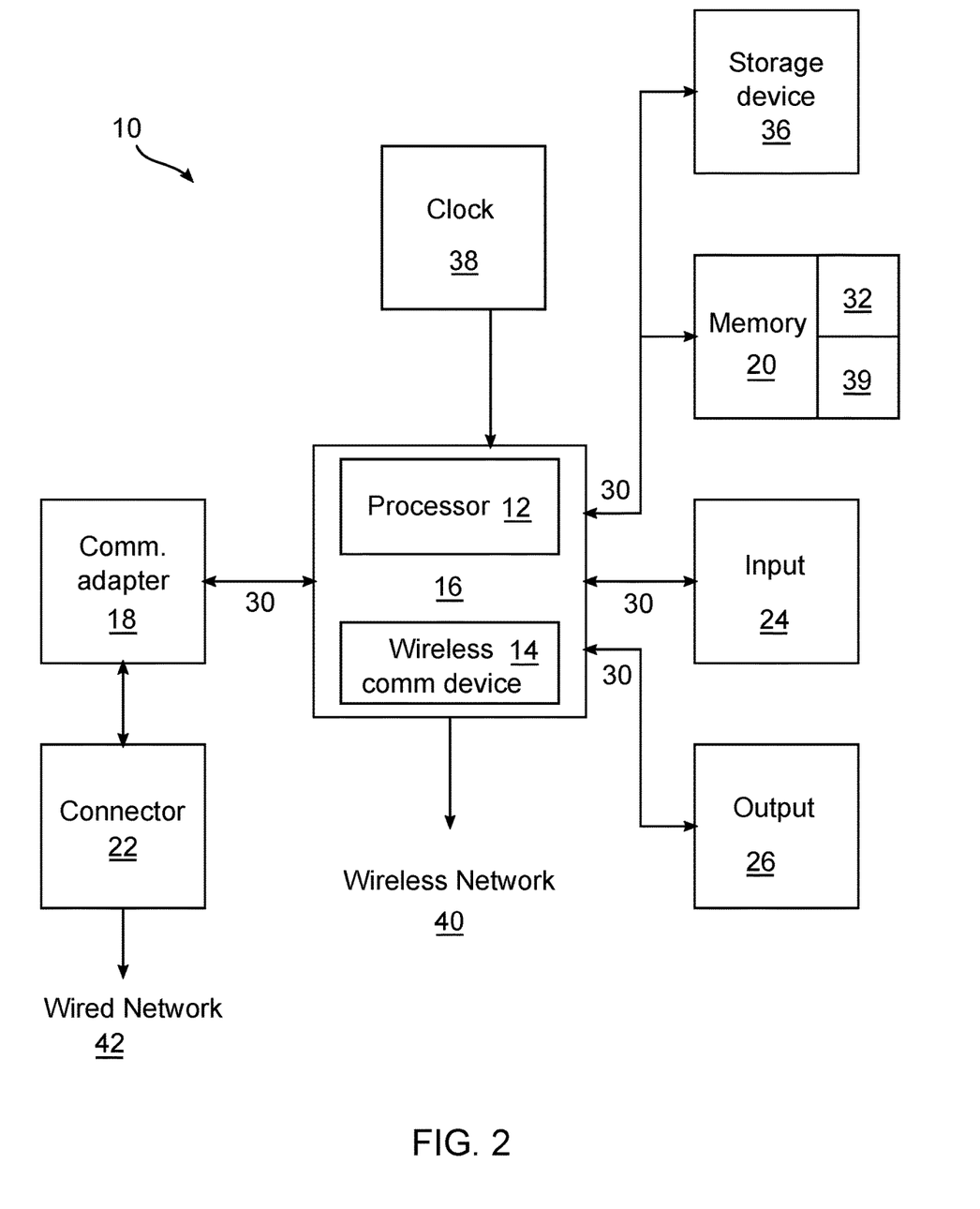
FIG. 2 illustrates an embodiment of a gateway that may be included in the backup system.

FIG. 2 illustrates an embodiment of the gateway 10. The gateway 10 may be a network node that enables communication with other electronic devices, such as one or more other gateways or routers and one or more actuating and sensing devices, and may possibly communicate with one or more other networks via the Internet. In an embodiment, the gateway 10 controls the operation of one or more actuating devices 74, possibly based, at least in part, on conditions one or more sensing devices 75 sense. The gateway 10 may so control that operation by communicating directly with, or indirectly with such as through other gateways or routers, the actuating devices 74, and possibly also the sensing devices 75 to signal to the actuating devices 74 to operate in specific ways and/or at specific times.

The gateway 10 may include a processor 12 and a wireless network communication device 14. The processor 12 and wireless communication device 14 may be combined in a controller 16, which may be a microcontroller. The gateway 10 may include storage thereon, which may be storage in the local area network for the gateway 10. The storage may be memory 20, a data storage device 36, a combination of both memory and the data storage device 36, or another device or devices for local storage of data. Thus, the storage may be considered storage on the gateway 10 whether the data is stored directly on the gateway or on a device or devices accessible by the gateway 10 over a local area network such as network 70 of FIG. 3. In an embodiment, the storage of the gateway may be or include a computer readable storage medium including code executable by the processor 12 of the gateway 10 to, at least in part, operate the backup system 1 and backup methods for the gateway 10 provided herein. The gateway 10 may also include a communication adaptor 18, a communication adaptor port or connector 22, one or more input devices 24, diagnostic output devices 26, and a clock 38.

The wireless communication device 14 may be a radio board or module, such as, for example, a ZigBee® network communication device. The gateway 10 may use the wireless communication device 14 to facilitate communications across one or more networks, including a wireless network 40 and a wired network 42, one or both of which may be part of a local area network (e.g. 70 shown in FIG. 3 and described below) and/or may communicate with one or more other networks.

It should be recognized that the gateway 10 may have fewer components or more components than shown in FIG. 2. For example, if an input device 24 or output device 26 is not desired, such a device may not be included in the gateway 10.

The elements, including the processor 12, communication adaptor 18, memory 20, input device 24, output device 26, and data storage device 36 related to the gateway 10 may communicate by way of one or more communication busses 30. Those busses 30 may include, for example, a system bus or a peripheral component interface bus.

The memory 20 may, for example, include random-access memory (RAM), flash RAM, dynamic RAM, or read only memory (ROM) (e.g., programmable ROM, erasable programmable ROM, or electronically erasable programmable ROM) and may store computer program instructions and information. The memory 20 may furthermore be partitioned into sections including an operating system partition 32 where system operating instructions are stored, and a data partition 39 in which data is stored.

The processor 12 may be any desired processor and may be a part of a controller 16, such as a microcontroller, may be part of or incorporated into another device, or may be a separate device. The processor 12 may, for example, be an Intel® manufactured processor or another processor manufactured by, for example, AMD®, DEC®, or Oracle®. The processor 12 may furthermore execute the program instructions and process the data stored in the memory 20. In one embodiment, the instructions are stored in the memory 20 in a compressed or encrypted format. As used herein the phrase, "executed by a processor," is intended to encompass instructions stored in a compressed or encrypted format, as well as instructions that may be compiled or installed by an installer before being executed by the processor 12.

The data storage device 36 may be, for example, non-volatile battery backed static random-access memory (RAM), a magnetic disk (e.g., hard drive), optical disk (e.g., CD-ROM) or any other device or signal that can store digital information. The data storage device 36 may furthermore have an associated real-time clock 38, which may be associated with the data storage device 36 directly or through the processor 12 or controller 16. The real-time clock 38 may trigger data from the data storage device 36 to be sent to the processor 12, for example, when the processor 12 polls the data storage device 36. Data from the data storage device 36 that is to be sent across the network 40 or 42 through the processor 12 may be sent in the form of messages in packets if desired. Those messages may furthermore be queued in or by the processor 12.

The communication adaptor 18 permits communication between the gateway 10 and other gateways 11 (depicted in FIG. 3), node 72 (depicted in FIG. 3) such as a router or gateway, devices, or other nodes coupled to the communication adaptor 18 at the communication adaptor connector 22. The communication adaptor 18 may be a network interface that transfers information from a node such as a node 72 that is a router or gateway, a networked device such as an actuating device 74 or sensing device 75 (depicted in FIGS. 1 and 3), a general purpose computer 76 (depicted in FIGS. 1 and 3), a user interface 77 such as a cell phone or part thereof (depicted in FIG. 3) or another gateway 11 to the gateway 10 or from the gateway 10 to a node 11, 72, 74, 75, 76, or 77. The communication adaptor 18 may be an Ethernet adaptor or another adaptor for another type of network communication. It will be recognized that the gateway 10 may alternately or in addition be coupled directly to one or more other devices through one or more input/output adaptors (not shown).

The input device 24 and output device 26 may couple the gateway 10 to one or more input or output devices such as, for example, one or more pushbuttons and diagnostic lights or displays. It will be recognized, however, that the gateway 10 does not necessarily need to have an input device 24 or an output device 26 to operate. Moreover, the data storage device 36 may also not be necessary for operation of the gateway 10 as data may be stored in memory 20, for example, or otherwise stored on the local area network (e.g., 70 of FIG. 3) as described herein such that this local data storage is considered part of the gateway 10 as connected thereto.

The processor 12 may include or be attached to the real-time clock 38 such that the real-time clock 38 may prompt the processor 12 to read or retrieve data regarding scheduled events when or subsequent to when those scheduled events are to occur. For example, the real-time clock 38 may indicate that it is time for one or more actuating devices 74 (and possibly one or more sensing devices 75 in an embodiment) to operate in a certain way. The data may be read or retrieved by the gateway 10 from local storage, such as the data storage device 36 or memory 20 or other local storage as described above. The retrieved data regarding the scheduled event or events, or a signal related to that data, may then be transmitted across the network 40 or 42, such as to the one or more actuating devices 74, possibly through other nodes, to signal for those devices 74 to so operate. One or more of such scheduled events may trigger messages to be sent at a time or in a cycle and, where more than one message is triggered to be sent across the network 40 or 42, those messages may form a queue. The queue may be created at the microprocessor 16.

Other devices, such as those illustrated in FIG. 1 and/or FIG. 3, including nodes 72 such as routers or gateways, actuating devices 74, sensing devices 75, the general purpose computer 76, FIGS. 1 and 3), and the user interface 77 may alternately be configured with some or all of the components discussed in connection with FIG. 2.

Figure 3:
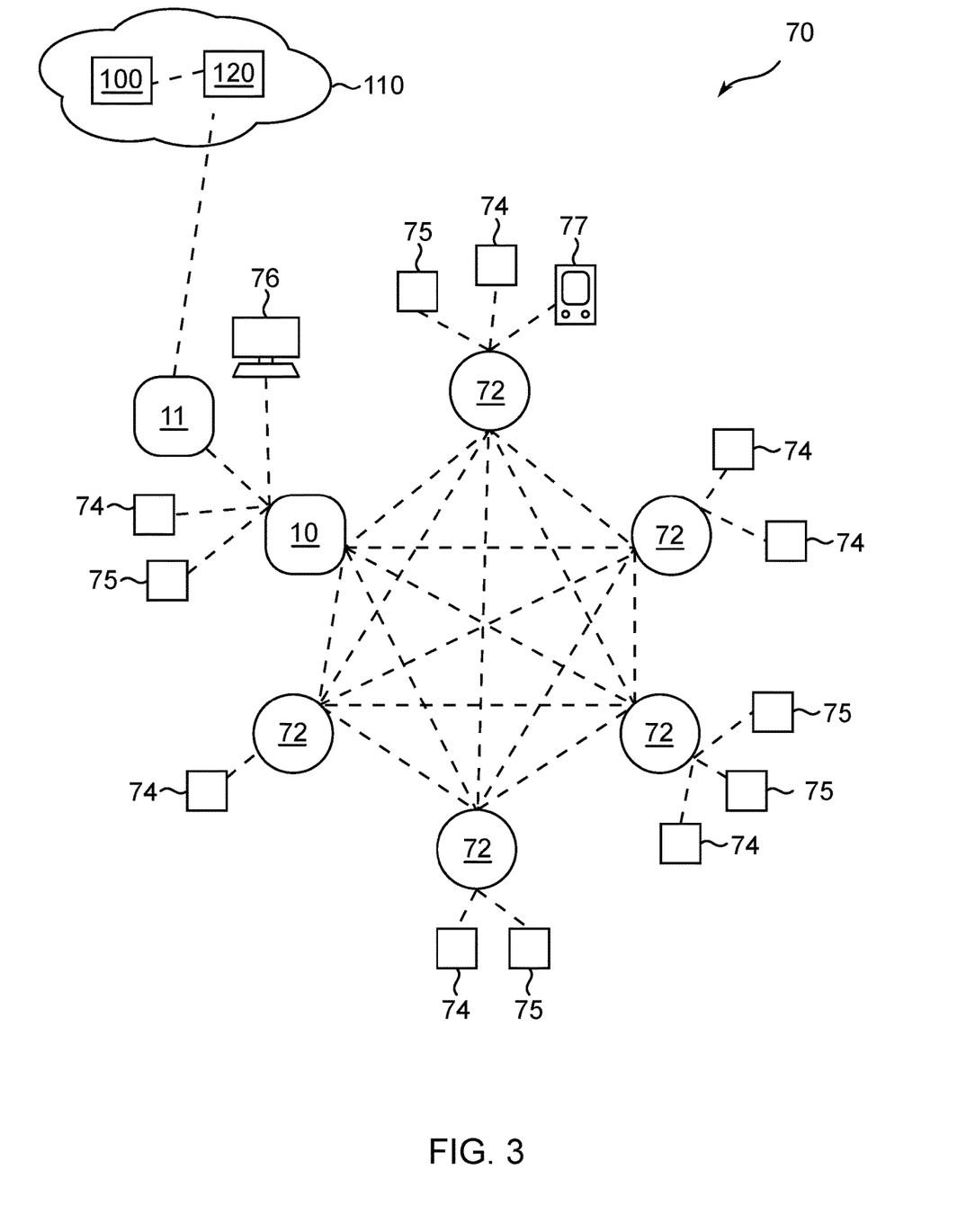
FIG. 3 illustrates an embodiment of a local area network the backup system for the gateway may operate with or include at least in part.

FIG. 3 illustrates an embodiment of a local area network 70, which may be or include a mesh network, for example, and which backup system 1 may operate with or include at least in part. Thus, the local area network 70 may include the gateway 10, and may also include one or any desired number of additional gateways 11, one or more nodes 72 such as routers or gateways, a plurality of actuating devices 74 and sensing devices 75, and one or more general purpose computers 76 and cell phones or other user interfaces 77. The one or more gateways 11 may be configured like the gateway 10 illustrated in FIG. 3, or may be of various configurations.

The gateway 10 may transmit messages across the wireless network 40, wired network 42, or local area network 70 (of which networks 40 and 42 may be a part). Those messages may enter a queue. The queue may be a packet queue where packets making up a message are queued for transmission across one or more of the wireless network 40, wired network 42, and local area network 70. The processor 12 of the gateway 10 may place the packets in that queue.

The messages the gateway 10 transmits across the wireless network 40, wired network 42, and/or local area network 70 may include messages to be used by one or more of the receiving nodes, e.g., one or more nodes 72 such as routers or gateways, actuating devices 74, and/or sensing devices 75 to cause an event with respect to one or more of the actuating devices 74, such as operating a switch to thereby turn a light on or off or energize a motor on a motorized window shade or blind.

In an embodiment of the backup system 1 for a gateway, data is stored on the gateway 10, which, as described above, may mean the data is stored in the memory 20, a data storage device 36, a combination of both memory 20 and the data storage device 36, or another device or devices for local storage of data on the local area network 70. The data stored on the gateway 10 may include a plurality of data elements that are each in a different one of a plurality of categories.

Figure 4:
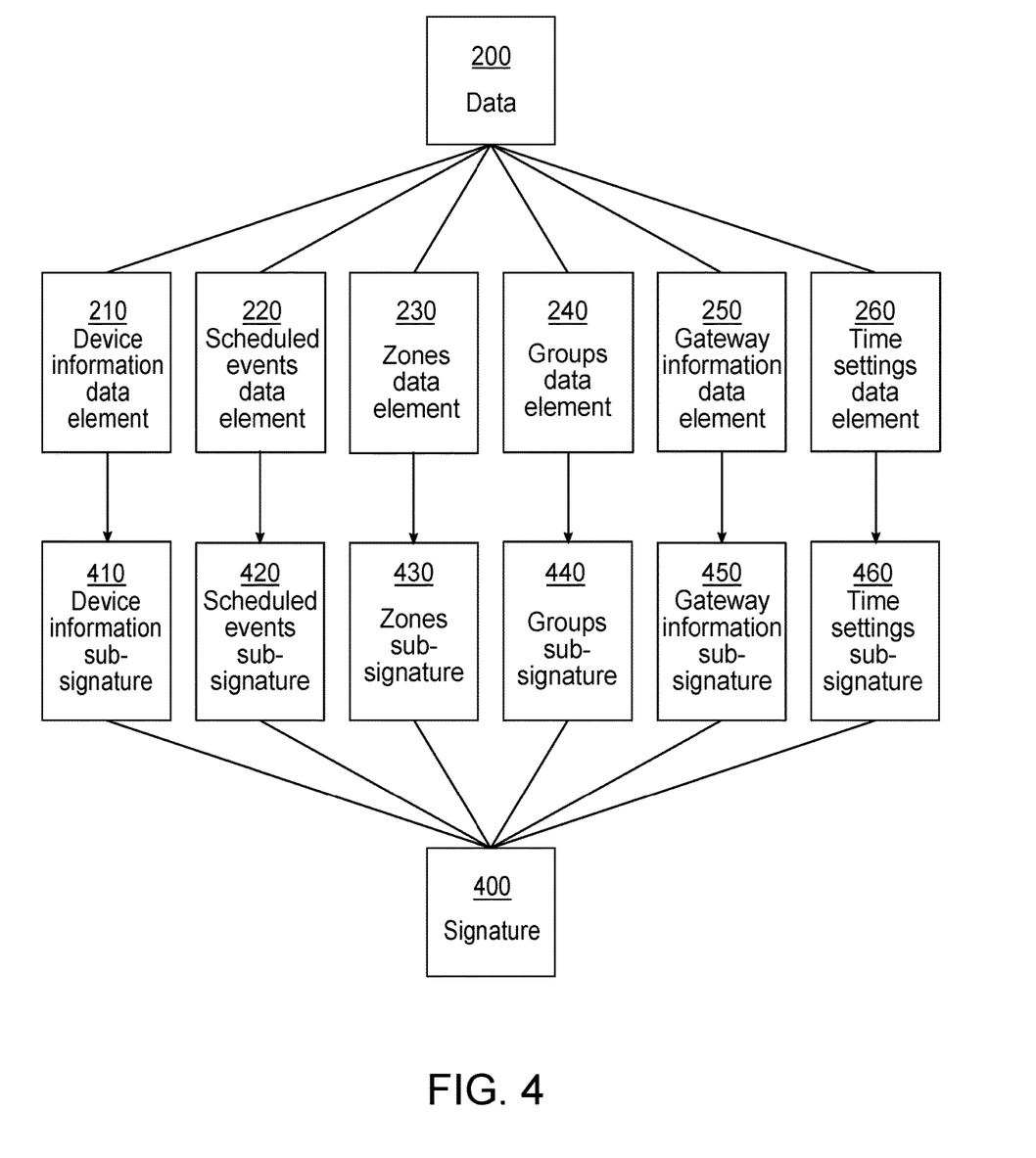
FIG. 4 illustrates embodiments of data and an associated signature used in the backup system for the gateway.

FIG. 4 illustrates embodiments of such data 200 that may be stored on the gateway 10 of the system 1, and at least part of the data 200 of which may regard operating a plurality of actuating devices 74 by way of the gateway 10. FIG. 4 also illustrates embodiments of a signature 400 associated with the data 200, and which is addressed below. The data 200 may be apportioned into data elements. The data elements may be portions of a large dataset in RAM, functionally independent data blocks, or a combination of the two, for example.

In an embodiment, the gateway 10 stores on the gateway 10 the data 200 including data elements in a plurality of categories that together regard the operation of a plurality of actuating devices 74 on a local area network, such as the local area network 70 shown and described with respect to FIG. 3. The categories so regard the operation of a plurality of actuating devices 74 by together being used by the gateway 10 and/or another component of the system 1 to trigger the operation in a specified way of those devices 74. In an embodiment, those categories may regard the operation of a plurality of actuating devices 74 at least in some cases based, at least in part, on conditions sensed by one or more sensing devices 75, such as for actuating devices 74 that are HVAC systems coupled with sensing devices 75 that are temperature sensors. Those categories may include, in an embodiment, a category of data element 210 that includes actuating device information, a category of data element 220 that includes scheduled events regarding the actuating devices, a category of data element 230 that includes zones in which the actuating devices are located, and a category of data element 240 that regards groups of actuating devices. In an embodiment, one or more of the data elements 210-240 include information regarding the sensing devices 75 and/or conditions the sensing devices 75 may sense that trigger at least some of the operations of one or more of the actuating devices 74.

The category of the data 200 data element 210 that includes actuating device information may include data that, at least in part, identifies the actuating devices 74 on the local area network (e.g. 70 of FIG. 3) on which the system 1 and its gateway 10 reside. The information may regard one or more of user specified name, manufacturer, model, serial number, software version, type of device, and device capabilities of each actuating device 74 on the local area network. The information may also include user specified names of the devices 74. The information may further include group membership assignments, which may assign the devices 74 into various groups such as zoned-based groups, smart groups, and/or user-specified groups such as described below. In an embodiment, if one or more of the actuating devices 74 are switches or controllers, the aforementioned identification may identify the powered devices to which those actuating devices 74 include or control. In an embodiment, the data element 210 may also include any of the aforementioned information but for one or more sensing devices 75.

The category of the data 200 data element 220 that includes scheduled events regarding the actuating devices may regard rules and schedules of operation of the actuating devices 74. The rules may be configurable behavior of the devices 74 based on sensor states, such as specified conditions to be sensed by one or more sensing devices 75, or timed events. For example, the behavior may be the turning on or off at certain times of certain fixtures or equipment that are, or are controlled by, actuating devices 74, the changing of color or intensity of lighting or equipment that are, or are controlled by, actuating devices 74, and the changing of temperature in a room by operation of actuating devices 74 that are, or control, HVAC devices or systems at certain times or based on temperatures detected by sensing devices 75 that are temperature sensors, etc. The schedules of operation may regard the times in which one or more devices 74 function according to the rules of behavior. In an embodiment, the schedules of operation regard, in part, user-specified holidays that govern rules of behavior of the devices 74 during those holidays. In an embodiment, the backup system 1 may use the clock 38 of the gateway 10 to signal to the gateway 10 the arrival of the times when the devices 74 should function as specified by the rules. In an embodiment, the data element 220 may also regard scheduled events, such as rules and schedules of operation, of the sensing devices 75.

The category of the data 200 data element 230 that includes zones in which the actuating devices 74 are located may include zones, such as areas or locations of a building where devices 74 on the local area network (e.g., 70 in FIG. 3) reside. In an embodiment, the zones are where actuating devices 74 that are powered devices, or where the powered devices associated with actuating devices 74 that are switches or controllers, reside. The zones may include one or more of a listing of user-specified zones, zone occupancy and/or vacancy control options, ambient light sensing control options, and sub-zone configurations. User-specified zones may be areas or locations in a building specified by a user who communicates with the gateway 10 of the backup system 1. Such areas or locations may include, for example, conference rooms, floors, and wings of the building. Zone occupancy and/or vacancy control options may set parameters for operating the actuating devices 74, such as lights and HVAC systems, when sensing devices 75, such as occupancy sensors, detect the presence (or lack thereof) of people within the zones. Ambient light sensing control options may regard parameters for controlling light in various zones, such as areas of a building, that receive sunlight. The ambient light sensing control options may be tied to sensing devices 75 that are light sensors in an embodiment. In an embodiment, ambient light sensing control options may be in the data 200 data element 220 that includes scheduled events regarding actuating devices. The sub-zone configurations may regard areas within zones, such as rooms within a floor. In an embodiment, the data element 230 that includes zones in which the actuating devices 74 are located may include scenes, which may be user-specified zone settings that can be recalled with a single multicast command. In an embodiment, the data element 230 may include other sensing device 75 information, such as areas or locations of a building where the sensing devices 75 on the local area network (e.g., 70 of FIG. 3) reside.

In an embodiment, the category of data element 240 that regards groups of actuating devices 74 may include groupings of specific such devices, such as zone-based groups regarding zones in which the devices are located, smart groups such as groups based on device needs within a zone, and/or user-specified groups. For example, groups of actuating devices 74 may be or include all actuating devices 74 that are, or which control, lights and outlets on a certain floor, all conference room lights, and conference room outlets on a certain floor. In an embodiment, the data element 240 also includes groupings of sensing devices 75.

In an embodiment regarding the backup system 1, the gateway 10 may process data elements (210, 220, 230, and/or 240) of the data 200 to control operation of the one or more actuating devices 74. The gateway 10 may so control those devices by sending instructions through the local area network (e.g., 70 in FIG. 3) directly to the devices 74, or indirectly such as through nodes 72, to prompt those devices 74 to operate in a certain way and/or at a certain time. For example, the gateway 10 may process the data element 210 regarding device information to identify certain actuating devices 74, such as lights (or switches for lights). Thus, the gateway 10 may process data element 220 regarding scheduled events to determine that those lights may be turned off at 8 PM every day. The gateway 10 may process data element 230 to determine a zone of a building, such as a floor, in which those lights should be turned off. The gateway 10 may then, such as upon receiving a signal from its clock 38, send a message through the local area network (e.g., 70 in FIG. 3) to a node or nodes 72 (see FIG. 3) at 8 PM to cause the connected actuating devices 74 that are lights (and/or are switches that control the lights) within the specified zone to be turned off. In another embodiment, the gateway 10 may process the data element 240 regarding a group of actuating devices 74 that is all conference room lights (and/or switches for those lights), such that the gateway 10 may send a message to the node or nodes 72 to cause all those conference room lights to be turned off, possibly at a certain time by processing the data element 230 regarding scheduled events.

In other embodiments, there may be more or fewer categories of data elements of the data 200 regarding the operation of the actuating devices 74 (and possibly sensing devices 75 in an embodiment) on the local area network (e.g. 70 in FIG. 3), and the data 200 may be differently distributed among those categories. Thus, there may be more or fewer than data elements 210, 220, 230, and 240, such as by combining or dividing those data elements.

In an embodiment of the data 200, in addition to data elements regarding the operation of a plurality of actuating devices 74, the data 200 may further regard other items. Thus, the data 200 may further include a category of data element 250 regarding gateway 10 information. That information may include MAC address, information regarding any cloud with which the gateway 10 directly or indirectly communicates and/or its components, hostname, model, update schedule, enabled feature mask, security settings, network information such as a ZigBee® network the gateway 10 created, and/or other information regarding the gateway 10. That information may, for example, identify the gateway 10 and/or regard settings of the gateway 10.

In an embodiment, the data 200 may further include a category of data element 260 regarding time settings. For example, the data element 260 may regard local time settings and include the time zone and daylight savings adjustment settings. In an embodiment, the gateway 10 may process the data element 260 to change the time of the clock 38 based on those settings.

In embodiments, and as described below, the backup system 1 and gateway 10 may use signatures to efficiently backup and restore data, such as data 200 including one or more of its categorized data elements (210, 220, 230, 240, 250, and 260), stored on the gateway 10 (e.g., memory 20, a data storage device 36, a combination of both memory 20 and the data storage device 36, or another device or devices for local storage of data on the local area network 70). If the data on the gateway 10 local storage changes, such as by being updated or restored, the gateway 10 may send a message through the local area network (e.g., 70 in FIG. 3) to change the operation of one or more actuating devices 74 (and possibly also sensing devices 75 in an embodiment) on that network. In an embodiment, the gateway 10 storage of the backup system 1 is or includes a storage medium including code executable by the processor 12 of the gateway 10 to cause the data 200 backup and restore and to operate, or change the operation of the actuating devices 74, such as described in the methods 300 and 500 of FIGS. 5 and 6, respectively.

Figure 5:
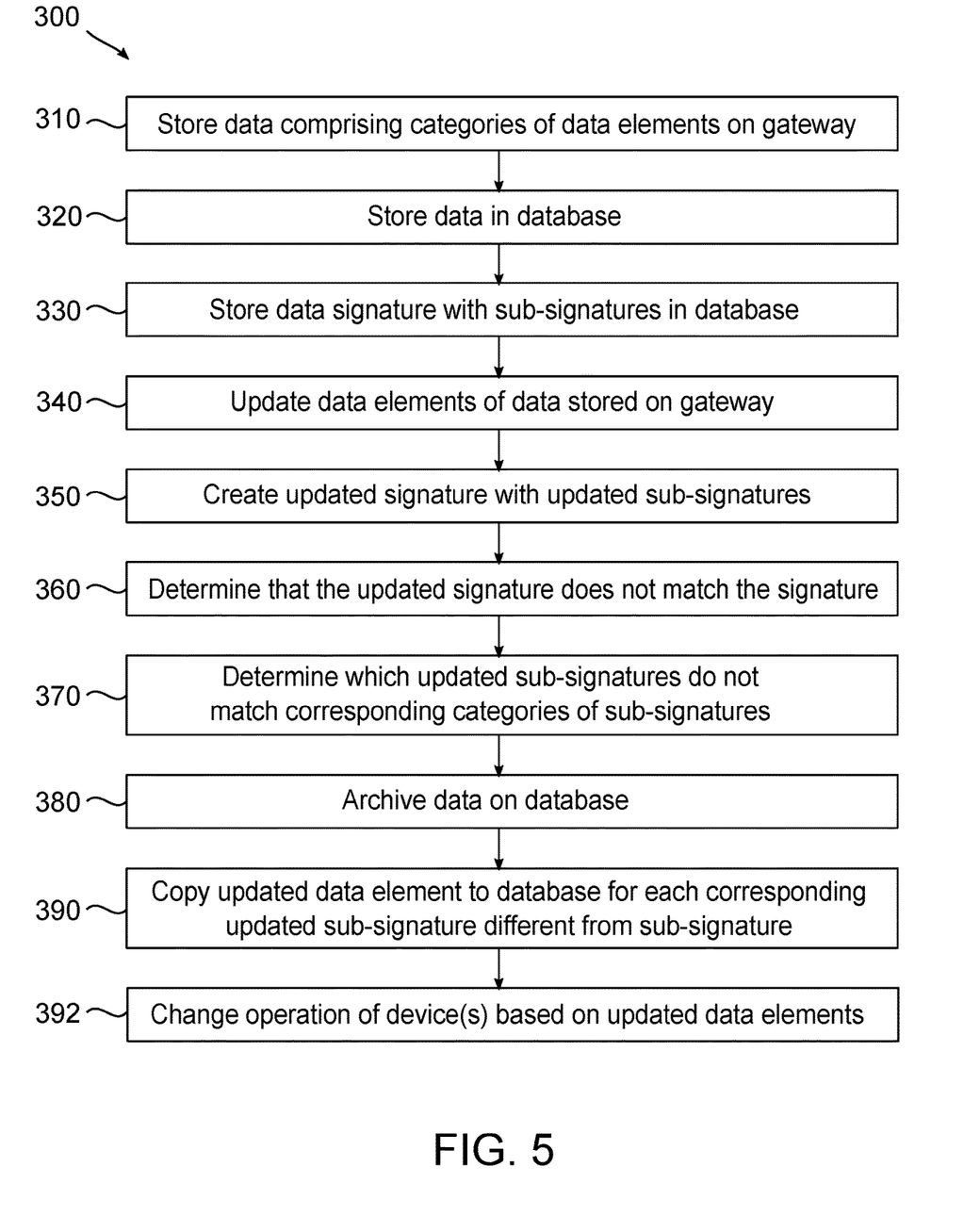
FIG. 5 is a flow chart of embodiments of a method for backing up data on a gateway.

FIG. 5 is a flow chart of a method 300 for backing up data on a gateway. In an embodiment, the gateway 10 such as described in embodiments herein performs such a backup method, though in other embodiments the method 300 may be performed, at least in part with the gateway 10, by a general purpose computer 76 or another device or devices. The method 300 is described herein as using the backup system 1 shown and described above, though in other embodiments the method 300 may use other configurations of backup systems and gateways. At 310, the gateway 10 may store thereon (e.g., in or on memory 20, a data storage device 36, a combination of both memory 20 and the data storage device 36, or another device or devices for local storage of data on the local area network (e.g., 70 of FIG. 3)) data 200 comprising data elements that are each in a different one of a plurality of categories that together regard the operation of a plurality of actuating devices 74 on the local area network (e.g., 70 in FIG. 3) on which the gateway 10 resides. The data elements may include, for example, the data element 210 in the category that includes actuating device information that, at least in part, identifies the actuating devices 74 on the local area network (e.g., 70 in FIG. 3), and the data element 220 in the category includes scheduled events regarding the identified devices 74. The data elements may also or alternatively include the data element 230 that includes zones in which the actuating devices 74 are located and/or the data element 240 that regards groups of actuating devices 74. As described above, in an embodiment the gateway 10 may also store in the data elements 210-240 similar sensing device 75 information and/or information associating the sensing devices 75 with the actuating devices 75.

In an embodiment at 310, the gateway 10 of the backup system 1 may further store data 200 comprising the data element 250 in the category regarding gateway information. In an embodiment at 310, the gateway 10 of the backup system 1 may further store data 200 comprising the data element 260 in the category regarding time settings.

At 320, the data 200 may be stored on the database 100 as desired. For example, in an embodiment the gateway 10 may copy the data 200 stored on the gateway 10 to the database 100. As described above, the database 100 may be, in an embodiment, a remote database on a remote network 110 and on, or in communication with such as via the Internet, a remote server 120. In that embodiment, the gateway 10 may copy the data 200 and its data elements (e.g., 210, 220, 230, 240, 250, and 260) to the database 100 via the gateway 11 or otherwise to the database 100 such that the database 100 stores that copy the gateway 10 transmitted thereto. The data 200 may be otherwise stored on the database 100 in other embodiments.

At 330, the backup system 1 stores on the database 100 a signature including sub-signatures that each represent a different one of the data elements (e.g., 210, 220, 230, 240, 250, and 260) of the data 200 along with the corresponding data element category. The storing on the database 100 of the signature may be as desired, such as by first having the gateway 10 or another device create the signature and transmit that signature or a copy thereof to the database 100 for storage, or otherwise as desired. In embodiments, any of the signatures described herein (e.g., signature 400, updated signature, archived signatures, etc.) may be stored other than where described, such as all being stored on the gateway 10 and/or elsewhere on the local area network (e.g., 70 of FIG. 3) or the network 110, for example.

Referring back to FIG. 4, the signature may be or include the signature 400 comprising sub-signatures. Each sub-signature may itself be a separate signature. The sub-signatures may each represent a different one of the data elements of the data 200 along with the corresponding category to which that data element belongs. For example, in an embodiment, the signature 400 comprises sub-signature 410 that represents the actuating device 74 information category of data element 210, sub-signature 420 that represents the scheduled events regarding the devices 74 category of data element 220, sub-signature 430 that represents the category of data element 230 that includes zones in which the devices 74 are located, sub-signature 440 that represents the category of data element 240 that regards groups of devices 74, sub-signature 450 that represents the category of data element 250 that regards gateway 10 information, and sub-signature 460 that represents the category of data element 260 that regards time settings.

The backup system 1 may create the signature 400 as desired. For example, in an embodiment the signature 400 is created by the gateway 10 and/or a general purpose computer 76 or other device by running each data element (e.g., 210, 220, 230, 240, 250, and 260) of the data 200 through a function that converts that data element into a value that is the sub-signature for that data element. The function may be or employ a checksum, cyclic redundancy check (CRC), hash, or other mathematical operation that converts a set of data into a sub-signature that is itself a finite signature. In an embodiment, the function may be one that makes it unlikely that different data elements will produce the same sub-signature. The sub-signatures for the data elements may then be concatenated into the signature 400. In an embodiment, the sub-signatures are fixed lengths such that the sub-signatures may be readily extracted from the signature 400. For example, the sub-signatures may be two units each, such as two letters or numbers. Those sub-signatures may be concatenated into an organized whole such that every two units of the signature 400 represent a known different one of the data elements (e.g., 210, 220, 230, 240, 250, and 260) and its corresponding category.

Referring again to FIG. 5 and the backup method 300, at 340, the data 200 stored on the gateway 10 may be updated by updating the data elements of the data 200. The data elements may be so updated by changing one or more of the data elements. For example, the data elements may include data elements 210, 220, 230, 240, 250, and 260. A user may update that data 200 and those data elements, which may result in changing data elements 210 and 230 by replacing those data elements 210 and 230 with different data, while not altering the categories of data elements 220, 240, 250, and 260. Those updated data elements in that example are thus the data elements (210-260) that still correspond to the same categories, except the data elements 210 and 230 are changed.

At 350, an updated signature is created. The updated signature may be created in the same way the signature was created, as described above, with updated sub-signatures each representing a different updated data element and the category to which that different data element belongs. Thus, referring again to the example in which data elements 210 and 230 of the data 200 were changed to result in the updated data and updated data elements, the updated signature is changed to reflect changes to those updated data elements. Thus, as data elements 210 and 230 were represented by sub-signatures 410 and 430, respectively, of the signature 400, the updated signature and its updated sub-signatures are the same as the signature 400 and sub-signatures 410-460 except the updated sub-signatures corresponding to sub-signatures 410 and 430 are changed. The updated signature with updated sub-signatures may be stored on the gateway 10 as described herein or otherwise stored where desired.

At 360, the backup method 300 may determine that the updated signature does not match the signature 400, such as by having the gateway 10 compare the updated signature and the signature 400 stored on the database 100 to determine that they do not match.

At 370, after determining at 360 that the updated signature does not match the signature 400, the gateway 10 may determine, for each of the plurality of categories of data elements of the data 200 (and thus for each same category of updated data elements of the updated data), whether the corresponding updated sub-signature of the updated signature and sub-signature (e.g., 410, 420, 430, 440, 450, or 460) of the signature 400 representing that category are different.

In an embodiment, at 380, because the data has been updated on the gateway 10 and is to be backed up on the database 100 as described below at 390, the backup system 1 may archive the data 200 stored on the database 100, such as by having the server 120 by prompt from the gateway 10, save another copy of the data 200 on the database 100 along with identifying information, such as meta-data including, as desired, creation date, last updated time such as a date including time, and/or a Universally Unique Identifier (UUID). The backup system 1 may archive the data 200 in association with the signature 400 such that the data 200 and signature 400 are linked. Thus, if the data 200 is to be restored to the gateway as described below in the method 500 of FIG. 6, the backup system 1 may compare the archived signature 400 with the current signature on the gateway 10 as described herein to efficiently determine changes to the data elements of the current data on the gateway 10 as compared to the data elements of the archived data 200.

At 390, for each updated sub-signature of the updated signature that is different than the sub-signature (e.g., 410, 420, 430, 440, 450, or 460) in a corresponding category represented by that sub-signature and updated sub-signature, the gateway 10 may copy to the database 100 the updated data element represented by that updated sub-signature. In so transmitting each such updated data element copy, the updated data element may replace the same category of the data element (e.g., 210, 220, 230, 240, 250, and 260) of the data 200 stored on the database 100.

In an embodiment, at 390 the gateway 10 may further replace the signature 400 on the database 100 with the updated signature. For example, the gateway 10 may transmit a copy of the entire updated signature to the database 100 to replace the entire signature 400 stored on the database 100. Alternatively, the gateway 10 may transmit for replacement on the database 100 only a copy of the updated sub-signatures that are different than the sub-signatures (e.g., 410, 420, 430, 440, 450, and/or 460) of the signature 400 for each represented category.

In an embodiment at 392, the backup system 1, via the updated data and updated data elements stored on the gateway 10, may cause, by way of the gateway 10, a change in operation of one or more of the actuating devices 74 on the local area network (e.g., 70 of FIG. 3). For example, the updated data elements may include an updated version of the data element 220 regarding scheduled events, such as an update to the timing of operation of actuating devices 74 that are or actuate certain lights within the local area network (e.g., 70 in FIG. 3). The gateway 10 may thus transmit a signal, such as to those lights or to a node 72, such as a router or gateway, that controls those lights (or switch therefore), to change the timing of when those lights turn off at night. The updated data elements may also or alternatively include an updated version of the data element 230 regarding zones in which the actuating devices 74 are located. For example, that updated version may include a change in the zone of lights that are to be turned off at the specified time, such as changing the zone from conference room lights of a floor to all lights of the floor. As described above, if desired, the changing in timing of operation of the actuating devices 74 may be triggered by using the clock 38 of the gateway 10 to signal to the gateway 10 that the revised time has been reached. In another example, the updated data elements may change the condition sensed by a sensor device 75 that would trigger an event by an actuating device 74, such as a different temperature sensed by a sensor device 75 that would trigger an HVAC (or controller therefore) actuating device 74 to turn on air conditioning. In an embodiment in which data elements 210-240 include similar information regarding sensing devices 75 as with the actuating devices 74, the gateway 10 may also transmit a signal to change the operation of one or more sensing devices 75.

In an embodiment, the method 300 is repeatedly performed. Thus, for example, after the method 300 has been completed, at least through 390, the current (non-archived) backed up data on the database 100, including updates to that data in the form of the gateway 10 data elements copied to the database 100 as described above at 390, may again be the same data that is on the gateway 10. Thus, the method 300 may be performed again by the system 1 with the current (last-updated) data considered being stored on both the gateway 10 at 310 and database 100 at 320, with a copy of the current (last-updated) signature and its sub-signatures corresponding to that (last-updated) data stored on the database 100 at 330 and possibly also stored on the gateway 10. Further, those current (last-updated) data elements of the (last-updated) data may again be updated on the gateway 10 at 340 and a new signature with sub-signatures may be created at 350 for the newly-updated data and data elements on the gateway 10. The method 300 can continue at 360 through 390, as described in more detail above, by, e.g., comparing the new signature with the (last-updated) signature on the database 100 such that the newly-updated data elements that changed may be determined and then copied from the gateway 10 to the database 100, possibly after archiving the current (last-updated) data and (last-updated) signature on the database 100. Thus, the current data and data elements on the gateway 10 and database 100 may again match. Further, the new signature stored or otherwise associated with the newly-updated data on the gateway 100 may be copied to the database 100.

A user of the system 1 may desire to restore to the gateway 10 one or more updated data elements of the updated data stored on the database 100. For example, one or more categories of updated data elements of the updated data stored on the gateway 10 may have changed again, such as by being corrupted. In such a case, the same one or more categories of updated data elements stored on the database 100 may be copied from the database 100 to the gateway 10, and thereby replace the one or more further changed (e.g., corrupted) updated data elements on the gateway 10. In an embodiment, that restoration may include first creating and comparing a further updated signature and its further updated sub-signatures on the gateway 10 associated with the further changed data with the updated signature and its updated sub-signatures stored on the database 100 to determine which corresponding data elements of the further updated data have changed. The restoration may be similar to that described with respect to the method 500 for restoring data on a gateway described below with respect to FIG. 6.

Figure 6:
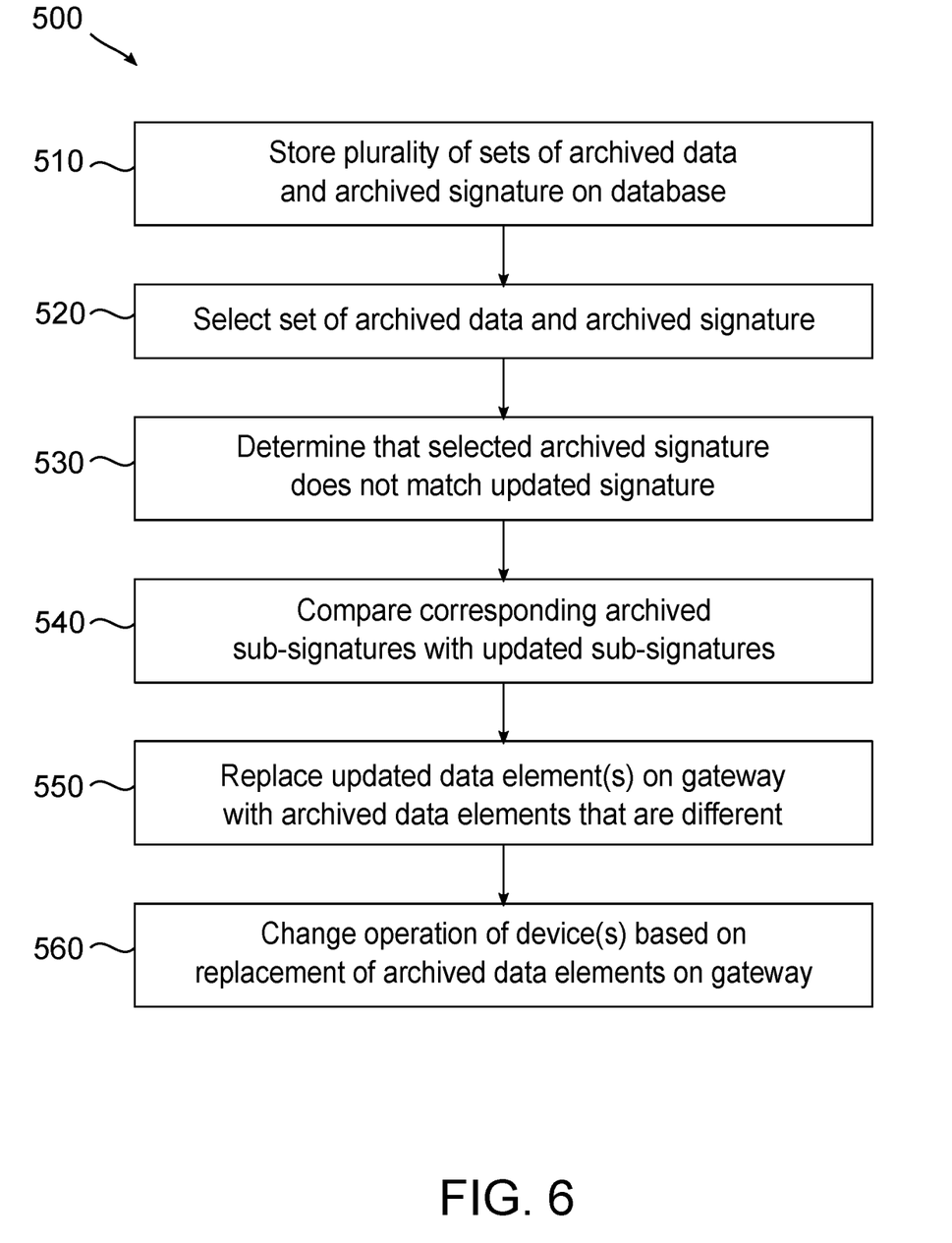
FIG. 6 is a flow chart of embodiments of a method for restoring data on a gateway.

FIG. 6 is a flow chart of a method 500 for restoring data on a gateway. In an embodiment, the method 500 is part of a backup method including the method 300 of FIG. 5 described above. As with the method 300, in an embodiment the gateway 10 of the backup system 1 performs the method 500 and the system 1 will be referred to when describing the method 500, though in other embodiments the method 500 may be performed, at least in part with the gateway 10, by a general purpose computer 76 or another device or devices.

At 510, the database 100 may store a plurality of sets each of archived data and a corresponding archived signature. Each set of archived data may include archived data elements in the categories of data elements (e.g., 210, 220, 230, 240, 250, and 260) of the data 200 described above. The archived data and archived data elements may be a copy of data that had been transmitted from the gateway 10. For example, each time the data (e.g., 200) on the gateway 10 is backed up to the database 100 such as described above with respect to the method 300 of FIG. 5, the server 120 or another device may first back up the last backed up data (e.g., updated data and its updated data elements in method 300 embodiment of FIG. 5) on the database 100. Thus, there may be many sets of archived data with corresponding archived data elements stored on the database 100, and stored along with that archived data may be meta-data including, for example, one or more identifiers such as the creation date, last updated date, a Universally Unique Identifier (UUID), and/or a counter value that is incremented with each successive set of archived data and corresponding archived signature to indicate archived data version.

For each set of archived data, at 510 an associated archived signature may be stored on the database 100. The archived signature may include archived sub-signatures that each represent a different one of the archived data elements, and thus that each represent a different one of the plurality of categories, such as described above with respect to the signature 400 and the sub-signatures (e.g., 410, 420, 430, 440, 450, and 460). At least some of the plurality of categories may thus together regard the operation of the plurality of actuating devices 74 (and possibly also sensing devices 75 in an embodiment) on the local area network (e.g., 70 of FIG. 3). The archived signature and archived sub-signature may have been created, such as described in the method 300 of FIG. 5 at 330 and 350, to represent data and data elements (original or updated one or more times) stored on the gateway 10 at least for a time.

Because each set of archived data and archived data elements stored at 510 on the database 100 may be a backup of the gateway 10 data at a different time and possibly after a change to that data on the gateway 10, each set of archived data may be different than the previous set such that one or more archived data elements of that set is changed relative to the previous archived set of archived data elements. Thus, also, the associated archived signature in a set may be different than the archived signature in the previous set. Thus, as used herein, sets of archived data and their data elements, along with the associated archived signature, may all be different, or at least may be different compared to the previously backed up set, though successive sets of archived data and signatures may be the same in one or more cases in other embodiments.

At 520, one of the sets of archived data and corresponding archived signature may be selected. For example, one or more of the data elements of the data currently stored on the gateway 10 may be corrupted, and a user may desire to restore a set of data and data elements that was stored on the gateway 10 before that corruption. A user may otherwise desire to restore data that had been stored on the gateway 10 and backed up to the database 100 on a prior date. The gateway 10, such as via a user communication therewith via a general purpose computer 76 or other device, may select the set of archived data and corresponding archived signature such as based on, as described above, one or more identifiers such as the creation date, last updated date, and/or a Universally Unique Identifier (UUID).

At 530, for the set of archived data and corresponding archived signature selected at 520, the system 1, such as via the gateway 10, determines that the archived signature stored on the database 100 does not match the updated signature stored on the gateway 10. The system 1 may make this determination by having the gateway 10 compare the updated signature associated with the updated data (or otherwise current signature associated with the current data) stored on the gateway 10 and the archived signature to determine that they do not match.

At 540, for each of categories represented by the updated sub-signatures of the updated signature stored on the gateway 10 and corresponding archived sub-signatures of the archived signature stored on the database 100, the system 1 may determine whether that updated sub-signature and archived sub-signature are different.

At 550, for each such archived sub-signature that is different from the corresponding updated sub-signature for each represented category, the archived data element represented by that archived sub-signature may be copied to the gateway 10, such as by the gateway 10 issuing a command to retrieve that archived data element. The command may be issued through the gateway 11 and/or server 120 in an embodiment. Each retrieved archived data element may replace on the gateway 10 the corresponding updated data element in the same category. Also at 550, in an embodiment, the archived signature may be copied to the gateway 10 to associate with the current data and data elements on the gateway 10. In that embodiment, the current immediate backup data and corresponding signature stored on the database 100 in the method 300 may also be changed to match the current data and signature now on the gateway 10. That change may be effected by using signatures as described in the method 300 if desired, or may use a similar method to copy over changed data elements of the selected archived data on the database 100 to the latest backup set of data (created in the method 300 above) on the database 100. As described herein, the database 100 may be considered one or more databases such that the copying of the changed data elements from the archive to the latest backup (as described in the method 300) on the database 100 may be a copying between different databases if desired.

At 560, the gateway 10 may send a signal through the local area network (e.g., 70 in FIG. 3), such as through a node 72, such as a router or gateway, to change the operation of at least one of the devices 74 and 75 based on the replacement of the updated data elements on the gateway 10 with the archived data elements.

In an embodiment, a change to data (e.g. 200) by way of change to one or more data elements (e.g. 210, 220, 230, 240, 250, and/or 260) as described herein may occur by gateway 10 replacement or the addition or removal of actuating devices 74 and/or sensing devices 75 reported to that gateway 10. In an embodiment, gateway 10 replacement may be recognized by the system 1 when the gateway 10 has no data stored thereon and/or no associated data signature. In that embodiment, the system 1 may assume that the gateway 10 is a new or replacement device on the local area network (e.g., 70 of FIG. 3) and may restore all data (e.g., 200) last copied to the database 100, including all data elements (e.g., 210, 220, 230, 240, 250, and 260) by copying that data from the backup database 100 to the gateway 10. In another embodiment, the gateway 10 may have a process for periodically backing up the data currently on the gateway 10.

As described in embodiments herein, the gateway backup system 1 and method 300 (and possibly also 500) embodiments herein may preserve bandwidth by efficiently backing up and restoring on the gateway only specific categories of elements of data regarding (possibly among other things) the operation of actuating devices (and possibly sensing devices in an embodiment). By using signatures with sub-signatures that represent those specific categories of data elements, the backup system and method embodiments herein more efficiently determine which categories of data elements should be backed up or restored. Thus, the backup system and method may more economically change the operation of actuating devices (and possibly sensing devices in an embodiment) on a local area network with which the gateway communicates.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalent.

What is claimed is:

1. A backup method, comprising:
   storing, on a gateway on a local area network, data that comprises data elements that are each in a different one of a plurality of categories that together regard operation of a plurality of actuating devices on the local area network;
   storing the data on a database;
   creating a signature comprising sub-signatures that each represent a different one of the data elements along with the category that data element is in;
   updating the data stored on the gateway by updating the data elements, such that the updated data elements of the updated data comprise the data elements except that one or more of the data elements in one or more of the plurality of categories are changed;
   creating an updated signature that comprises updated sub-signatures that each represent a different one of the updated data elements of the updated data stored on the gateway, and thus each represent said different one of the plurality of categories;
   determining that the updated signature does not match the signature;
   determining, for each of the categories, whether the updated sub-signature and sub-signature representing that category are different; and
   copying, from the gateway to the database, for each category in which the updated sub-signature and sub-signature representing that category are different, the updated data element in that category and thereby replacing, with that updated data element, the data element in that category stored on the database.

2. The method of claim 1, further comprising causing, by way of the gateway, via the updated data comprising the updated data elements stored on the gateway, a change in operation of one or more of the plurality of actuating devices.

3. The method of claim 2, wherein the change in operation of the one or more of the plurality of actuating devices comprises a change in operation of at least one actuating device in a specified zone.

4. The method of claim 2, wherein the change in operation of the one or more of the plurality of actuating devices comprises a change in operation of at least one actuating device based, at least in part, on a change to a set condition to be sensed by one or more sensing devices.

5. The method of claim 1, further comprising, before the copying, from the gateway to the database for each category in which the updated sub-signature and sub-signature representing that category are different, of the updated data element in that category and thereby the replacing, with that updated data element, the data element in that category stored on the database:
   archiving the data and the signature.

6. The method of claim 1, further comprising:
   further updating the updated data stored on the gateway by further updating the updated data elements, such that the further updated data elements of the further updated data comprise the updated data elements except that one or more of the updated data elements in one or more of the plurality of categories are changed;
   creating a further updated signature that comprises further updated sub-signatures that each represent a different one of the further updated data elements of the further updated data stored on the gateway, and thus each represent said different one of the plurality of categories;
   determining that the further updated signature does not match the updated signature;
   determining, for each of the categories, whether the updated sub-signature and the further updated sub-signature representing that category are different;
   copying, from the database to the gateway, for each category in which the updated sub-signature and further updated sub-signature representing that category are different, the one of the data element and the updated data element in that category stored on the database and thereby replacing, with that copied one of the data element and the updated data element, the further updated data element in that category stored on the gateway.

7. The method of claim 1, further comprising:
- storing, on the database, a plurality of sets each comprising both archived data and a corresponding archived signature, wherein for each of the sets:
  - the storing of the archived data comprises storing archived data elements that are each in a different one of the plurality of categories regarding the operation of the plurality of actuating devices on the local area network; and
  - the storing of the archived signature comprises storing archived sub-signatures that each represent a different one of the archived data elements of the archived data, and thus each represent one of the different ones of the plurality of categories;
- selecting one of the sets comprising both the archived data and the corresponding archived signature;
- determining, for the selected set of both the archived data and the corresponding archived signature, that the archived signature does not match the updated signature;
- determining for the selected set of both the archived data and the corresponding archived signature, for each of the categories, whether the archived sub-signature and updated sub-signature representing that category are different; and
- copying, from the selected set of both the archived data and the corresponding archived signature, from the database to the gateway, for each category in which the archived sub-signature and updated sub-signature representing that category are different, the archived data element in that category and thereby replacing, with that archived data element, the updated data element in that category stored on the gateway.

8. The method of claim 7, further comprising changing, by way of the gateway, the operation of at least one of the actuating devices by way of the replacement of the updated data element stored on the gateway with the archived data element for said each category in which the archived sub-signature and updated sub-signature representing that category are different.

9. A backup system, comprising:
- a gateway on a local area network, the gateway comprising a processor and a computer readable storage medium, the computer readable storage medium including code executable by the processor to:
- store, on a gateway on a local area network, data that comprises data elements that are each in a different one of a plurality of categories that together regard operation of a plurality of actuating devices on the local area network;
- store the data on a database;
- create a signature comprising sub-signatures that each represent a different one of the data elements along with the category that data element is in;
- update the data stored on the gateway by updating the data elements, such that the updated data elements of the updated data comprise the data elements except that one or more of the data elements in one or more of the plurality of categories are changed;
- create an updated signature that comprises updated sub-signatures that each represent a different one of the updated data elements of the updated data stored on the gateway, and thus each represent said different one of the plurality of categories;
- determine that the updated signature does not match the signature;
- determine, for each of the categories, whether the updated sub-signature and sub-signature representing that category are different; and
- copy, from the gateway to the database, for each category in which the updated sub-signature and sub-signature representing that category are different, the updated data element in that category and thereby replace, with that updated data element, the data element in that category stored on the database.

10. The system of claim 9, the computer readable storage medium including code executable by the processor of the gateway to further:
- cause, by way of the gateway, via the updated data comprising the updated data elements, a change in operation of one or more of the plurality of actuating devices.

11. The system of claim 10, wherein the change in operation of the one or more of the plurality of actuating devices comprises a change in operation of at least one actuating device in a specified zone.

12. The system of claim 10, wherein the change in operation of the one or more of the plurality of actuating devices is based, at least in part, on a change to a set condition, sensed by one or more sensing devices, that triggers the change in operation.

13. The system of claim 10, the gateway further comprising a clock, the change in operation of the one or more of the actuating devices comprising using the clock on the gateway to signal to the gateway to cause a change in a timing of operation of at least one of the one or more of the actuating devices.

14. The system of claim 9, wherein the plurality of categories together further regard operation of a plurality of sensing devices on the local area network.

15. The system of claim 14, the computer readable storage medium including code executable by the processor of the gateway to further:
- cause, by way of the gateway, via the updated data comprising the updated data elements, a change in operation of one or more of the plurality of sensing devices.

16. The system of claim 9, the plurality of categories regarding the operation of the plurality of actuating devices on the local area network comprising one or more categories that together identify the actuating devices and another category that comprises scheduled events regarding the identified actuating devices.

17. The system of claim 9, the data further comprising an additional data element that is in an additional category comprising gateway information.

18. The system of claim 9, the data further comprising an additional data element that is in an additional category regarding time settings.

19. The system of claim 9, the computer readable storage medium including code executable by the processor of the gateway to further:
- further update the updated data stored on the gateway by further updating the updated data elements, such that the further updated data elements of the further updated data comprise the updated data elements except that one or more of the updated data elements in one or more of the plurality of categories are changed;
- create a further updated signature that comprises further updated sub-signatures that each represent a different one of the further updated data elements of the further updated data stored on the gateway, and thus each represent said different one of the plurality of categories;
determine that the further updated signature does not match the updated signature;
determine, for each of the categories, whether the updated sub-signature copied to the database and the further updated sub-signature representing that category are different;
copy, from the database to the gateway, for each category in which the updated sub-signature and further updated sub-signature representing that category are different, the one of the data element and the updated data element in that category stored on the database and thereby replace, with that copied one of the data element and the updated data element, the further updated data element in that category stored on the gateway.

20. The system of claim 9, wherein the database is on a network that is remote from the local area network.

21. The system of claim 9, the computer readable storage medium including code executable by the processor of the gateway further to:
store, on the database, a plurality of sets each comprising both archived data and a corresponding archived signature, wherein for each of the sets:
the storing of the archived data comprises storing archived data elements that are each in a different one of the plurality of categories regarding the operation of the plurality of actuating devices on the local area network; and
the storing of the archived signature comprises storing archived sub-signatures that each represent a different one of the archived data elements of the archived data, and thus each represent one of the different ones of the plurality of categories;
select one of the sets comprising both the archived data and the corresponding archived signature;
determine, for the selected set of both the archived data and the corresponding archived signature, that the archived signature does not match the updated signature;
determine for the selected set of both the archived data and the corresponding archived signature, for each of the categories, whether the archived sub-signature and updated sub-signature representing that category are different; and
copy, from the selected set of both the archived data and the corresponding archived signature, from the database to the gateway, for each category in which the archived sub-signature and updated sub-signature representing that category are different, the archived data element in that category and thereby replace, with that archived data element, the updated data element in that category stored on the gateway of the local area network.

22. The system of claim 21, the computer readable storage medium including code executable by the processor of the gateway to further change, by way of the gateway, the operation of at least one of the actuating devices by way of the replacement of the updated data element stored on the gateway with the archived data element for said each category in which the archived sub-signature and updated sub-signature representing that category are different.

23. A data backup system, comprising:
a remote database that is remote from a local area network, the remote database storing:
first data that comprises first data elements that are each in a different one of a plurality of categories regarding operation of a plurality of actuating devices on the local area network; and
a first signature comprising first sub-signatures that each represent a different one of the data elements along with the corresponding said different one of the plurality of categories that data element is in;
a gateway on the local area network, the gateway storing:
second data that comprises second data elements that each are in a different one of the plurality of categories regarding the operation of the plurality of actuating devices on the local area network; and
a second signature that comprises second sub-signatures that each represent a different one of the second data elements of the second data, and thus each represent said different one of the plurality of categories that second data element is in;
wherein the gateway comprises a processor and a computer readable storage medium including code executable by the processor to:
determine whether the second signature matches the first signature, and if the second signature does not match the first signature, determine, for each of the plurality of categories, whether the corresponding second sub-signature and first sub-signature representing that category are different; and
copy, from the gateway to the remote database, for each category in which the second sub-signature and first sub-signature representing that category are different, the second data element in that category and thereby replacing, with that second data element, the first data element in that category stored on the remote database.

24. A data backup system, comprising:
a remote database that is remote from a local area network, the remote database storing a plurality of sets each of both first data and a corresponding first signature, wherein the first data is different in at least a plurality of the sets and the first signature is different in at least a plurality of the sets, wherein for each of the sets:
the first data comprises first data elements that each represent a different one of a plurality of categories regarding operation of a plurality of actuating devices on the local area network; and
the first signature comprises first sub-signatures that each represent both a different one of the first data elements of the first data and the category that different one of the first data elements is in;
a gateway on the local area network, the gateway storing:
second data that comprises second data elements that each are in said different one of the plurality of categories regarding the operation of the plurality of actuating devices on the local area network; and
a second signature that comprises second sub-signatures that each represent a different one of the second data elements of the second data, and thus each represent said different one of the plurality of categories that second data element is in;
wherein the gateway comprises a processor and a computer readable storage medium including code executable by the processor to:
determine, for a selected one of the sets of both first data and corresponding first signature, whether the first signature matches the second signature, and if the first signature does not match the second signature, determine, for each of the plurality of categories, whether the first sub-signature and second sub-signature representing that category are different; and copy from the remote database to the gateway, for the selected one of the sets of first data and corresponding first signature, for each first sub-signature that is different than the corresponding second sub-signature for each of the represented plurality of categories, the first data element in that category and thereby replace, with that first data element, the second data element in that category stored on the gateway.

25. The data backup system of claim 24, the gateway comprising the processor and the computer readable storage medium including code executable by the processor to further, via said for each first sub-signature that is different than the corresponding second sub-signature for each of the represented plurality of categories, said replacing, with that first data element, the second data element in that category stored on the gateway:

cause a change in operation of at least one of the plurality of actuating devices on the local area network.

* * * * *